W. N. MATTHEWS.
Improvement in Wood-Screws.

No. 129,898.                   Patented July 30, 1872.

Witnesses.
F. B. Hunt
John Bell

Inventor.
William N. Matthews

UNITED STATES PATENT OFFICE.

WILLIAM N. MATTHEWS, OF RICHMOND, INDIANA.

IMPROVEMENT IN WOOD-SCREWS.

Specification forming part of Letters Patent No. 129,898, dated July 30, 1872.

Specification describing certain Improvements in Screws for the Fellies of Carriage-Wheels, invented by WILLIAM N. MATTHEWS, of Richmond, in the county of Wayne and State of Indiana.

My invention relates to the construction of wood-screws for the fellies of carriage-wheels, whereby the fellies are prevented from splitting by the thread of the screw, the screw being inserted or driven through the felly on either side of the tenon of the spoke, and cut off on each side of the felly even with the face of the same, the entire tension being on the thread of the screw.

Figure 1:
Figure 2:
Figure 3:
Figure 4:

Figure 1 is a side view of the screw. Fig. 2 is a view of the ordinary wood-screw as now manufactured for carriage-wheels, the thread being cut nearer to the head in order to make it applicable to carriage-fellies, and is here given in order to contrast the present mode with my invention. Figs. 3 and 4 are top views of Figs. 1 and 2, respectively.

In my invention the projecting head is omitted, and the upper end or neck of the screw above the thread is made round, as in Fig. 1.

In applying the screw the neck is clamped sufficiently tight by any suitable jaws or clamps to drive the screw.

By making it as described I further cheapen construction, as the upper part of the screw, by which it is driven, is simply left as cut from the wire from which it is made.

In manufacturing the common wood-screw as now used for carriage-fellies, by far the larger portion of the cost of production is in the projecting head and in the slotting, the wire from which the screw is made being cut sufficiently long to allow the projecting head to be upset or driven upon one end, and after the screw is turned it costs more to slot the head than all the other operations combined; whereas in my invention the projecting head, the turning of the same, and the slotting are omitted entirely, and I save at least one-third of the raw material, beside making a greatly improved screw for the purpose, as the resistance of the slanting projecting head inclines the chisel or cutter to mar the wood in cutting off the screw after it is driven to its place, which is entirely avoided in a screw made as herein described.

I do not claim cheapness of manufacture; neither do I claim a wood-screw without a projecting head and driven by the neck; as such have been known and used for other purposes, as in the patent of W. S. Steiger, of January 8, 1842; and other references might be cited. Neither do I claim a screw which is made in continuous wire or otherwise, with a continuous thread from end to end, as described in the patent of Theodore Salorgne, July 7, 1868, because I am not aware of any practical means by which such a screw can be driven into hard wood. The unchased cylindrical neck, to afford a hold for clamps or jaws, is an indispensable feature in my invention. The peculiar clamp which I prefer to employ for this purpose, and have used with good effect, forms the subject of a separate application for Letters Patent.

I claim—

As a new article of manufacture, the headless wood-screw herein described, formed with a smooth cylindrical neck and without a nick, as and for the purpose specified.

WILLIAM N. MATTHEWS.

Witnesses:
F. B. HUNT,
JOHN BELL.